United States Patent [19]

Sharpe

[11] 4,229,986
[45] Oct. 28, 1980

[54] AXIAL LOADING DEVICE

[75] Inventor: Raymond Sharpe, Mirfield, England

[73] Assignee: Lucas Industries Limited, Birmingham, England

[21] Appl. No.: 73,231

[22] Filed: Sep. 7, 1979

Related U.S. Application Data

[63] Continuation of Ser. No. 824,151, Aug. 12, 1977, abandoned.

[30] Foreign Application Priority Data

Aug. 14, 1976 [GB] United Kingdom ............. 33907/76

[51] Int. Cl.³ ............................................. F16H 15/38
[52] U.S. Cl. .................................................. 74/200
[58] Field of Search ............... 74/198, 199, 200, 196, 74/208, 285; 267/158, 161, 162

[56] References Cited

U.S. PATENT DOCUMENTS

| | | | |
|---|---|---|---|
| 2,172,678 | 9/1939 | Heftler | 267/158 |
| 2,239,087 | 4/1941 | Erban | 74/208 |
| 2,424,511 | 7/1947 | Stanley et al. | 267/158 X |
| 3,107,766 | 10/1963 | Pritchard | 267/161 X |
| 3,185,141 | 5/1965 | Miracki et al. | 267/158 |
| 3,237,739 | 3/1966 | Pritchard | 267/161 |
| 3,413,864 | 12/1968 | Magill et al. | 74/200 |
| 3,424,018 | 1/1969 | Alsch | 74/198 |
| 3,585,871 | 6/1971 | Alsch | 74/198 |
| 3,802,284 | 4/1974 | Sharpe et al. | 74/200 |
| 3,823,613 | 7/1974 | Abbot | 74/200 |
| 3,826,147 | 7/1974 | Sharpe et al. | 74/200 |
| 3,826,148 | 7/1974 | Magill | 74/200 |
| 3,828,618 | 8/1974 | Sharpe et al. | 74/200 |
| 3,996,807 | 12/1976 | Adams | 74/200 X |
| 4,026,167 | 5/1977 | Archer | 74/785 |
| 4,186,616 | 2/1980 | Sharpe | 74/200 |

FOREIGN PATENT DOCUMENTS

| | | | |
|---|---|---|---|
| 537651 | 5/1955 | Belgium | 74/198 |
| 821860 | 10/1959 | United Kingdom | 74/198 |
| 1268641 | 3/1972 | United Kingdom | 74/200 |
| 1325602 | 8/1973 | United Kingdom | 74/200 |

Primary Examiner—C. J. Husar
Assistant Examiner—Moshe I. Cohen
Attorney, Agent, or Firm—Kane, Dalsimer, Kane, Sullivan and Kurucz

[57] ABSTRACT

An axial loading device for use, for example, in a transmission system having toroidal discs with rollers engaged between toroidal surfaces thereon, the device including spring means acting between an abutment and a member to which axial pressure is applied, the member being axially movable relatively to the abutment and the spring means acting on one part of said member in a first axial position of said member and acting on a further part of said member when it is in a further axial position, the said one part of the member being spaced from said further part of the member radially of the axis thereof so that differential axial loading is applied to said member by said spring means when the member occupies said first and said further axial positions, respectively.

4 Claims, 4 Drawing Figures

AXIAL LOADING DEVICE

This is a continuation of application Ser. No. 824,151, filed Aug. 12, 1977, now abandoned.

BACKGROUND AND SUMMARY OF THE INVENTION

This invention relates to a device for applying an axial load to a member and in which the force applied by said device differs under differing operating conditions.

One example of apparatus in which such axial loading device is used is a variable ratio frictional drive gear of the kind comprising basically two axially spaced torus discs or rotors, one serving as an input and the other an output, between which there is a set of circumferentially spaced drive rollers in frictional rolling contact with part toroidal surfaces on the discs, each roller being rotatably mounted in a bearing structure which can tilt about an axis at right angles to the axis of rotation of each roller so as to vary distances from the gear axis at which the roller engages the two discs respectively, thus varying the drive ratio of the gear. The angle of tilt of the roller bearing structure as it controls the drive ratio of the gear is called the ratio angle. There is furthermore provided means which is normally fluid pressure operated, for loading the discs axially so that there is pressure between the toroidal surfaces and the surfaces of the rollers engaging them.

One way of changing the ratio angle is to provide means to apply a force to each of the roller bearing structures to move it generally tangentially with respect to the gear axis, and by allowing the rollers then to steer themselves towards a different ratio angle. The rollers are each mounted in their bearing structures in such a way that they are inclined at an angle to a plane perpendicular to the gear axis. This angle is called the caster angle. Gears of this general construction are referred to as gears with tangentially controlled roller bearing structures.

End loading, as the axial loading under fluid pressure is usually called, must be substantial, though when hydraulic pressure is not available it is still necessary for some force to be applied. Furthermore the higher the speed and the higher the load, being transmitted through the transmission system the higher the pressure must be in order to maintain frictional contact between the rotor toroidal and roller surfaces, in order, in turn, to maintain efficiency of load transmission. The frictional contact may be through the agency of lubricating fluid which in this type of apparatus is usually referred to as tractant fluid.

The input must rotate in the direction in which it tends to drag each roller against the control force which controls the tangential position of the rollers. The caster angle must be such that each roller tilt axis is inclined away from the input disc in the direction of movement of the disc. This criterion arises out of the fact that stable operation at any given ratio angle occurs when the axis of rotation of each roller passes through the gear axis. Unless the caster angle is as just described, tangential displacement of a roller (by virtue of an increase or decrease in the load on the gear or in controlling fluid pressure will result in the torus discs producing a steering force on the roller which will tilt the roller in the direction opposite to that which is required to move the roller axis back to intersect the gear axis, so that the roller will be moved away from, instead of towards, its new stable position.

This invention is particularly though not exclusively concerned with gears in which the plane of each roller normal to the axis of rotation of the roller and passing through the points of contact of the roller with the two opposed torus discs, contains the axis about which the roller tilts, being tangential to the torus centre circle (i.e. the locus of the centre of the circle revolved to generate the torus) as distinct from gears in which the same plane for each roller is closer to the main axis of rotation of the gear.

The object of the invention is to provide a device for applying axial loading to a member in an effective manner in varying operating conditions.

According to the invention an axial loading device for applying an axial load to a member includes spring means acting between an abutment and the member, which is axially movable relative to said abutment, the spring means acting on one part of said member in a first axial position of said member and acting on a further part of said member when it is in a further axial position, the said one part of the member being spaced from the said further part of said member, such that different axial loading is applied to said member by said spring means when the member occupies said first and said further axial positions respectively.

BRIEF DESCRIPTION OF THE DRAWINGS

The invention will now be described by way of example with reference to the accompanying drawings, in which.

DESCRIPTION OF THE INVENTION

The transmission system is principally designed for use in driving aircraft accessories and in particular an alternator. The alternator is driven from an aircraft main engine but is required to be rotated at constant speed. The transmission is therefore designed for variable input speed, but constant output speed. It is however, to be understood that transmissions incorporating the invention as herein defined can be used in transmissions of this sort with other operating characteristics including constant input and variable output speed and variable input as well as output speeds.

Figure 1:
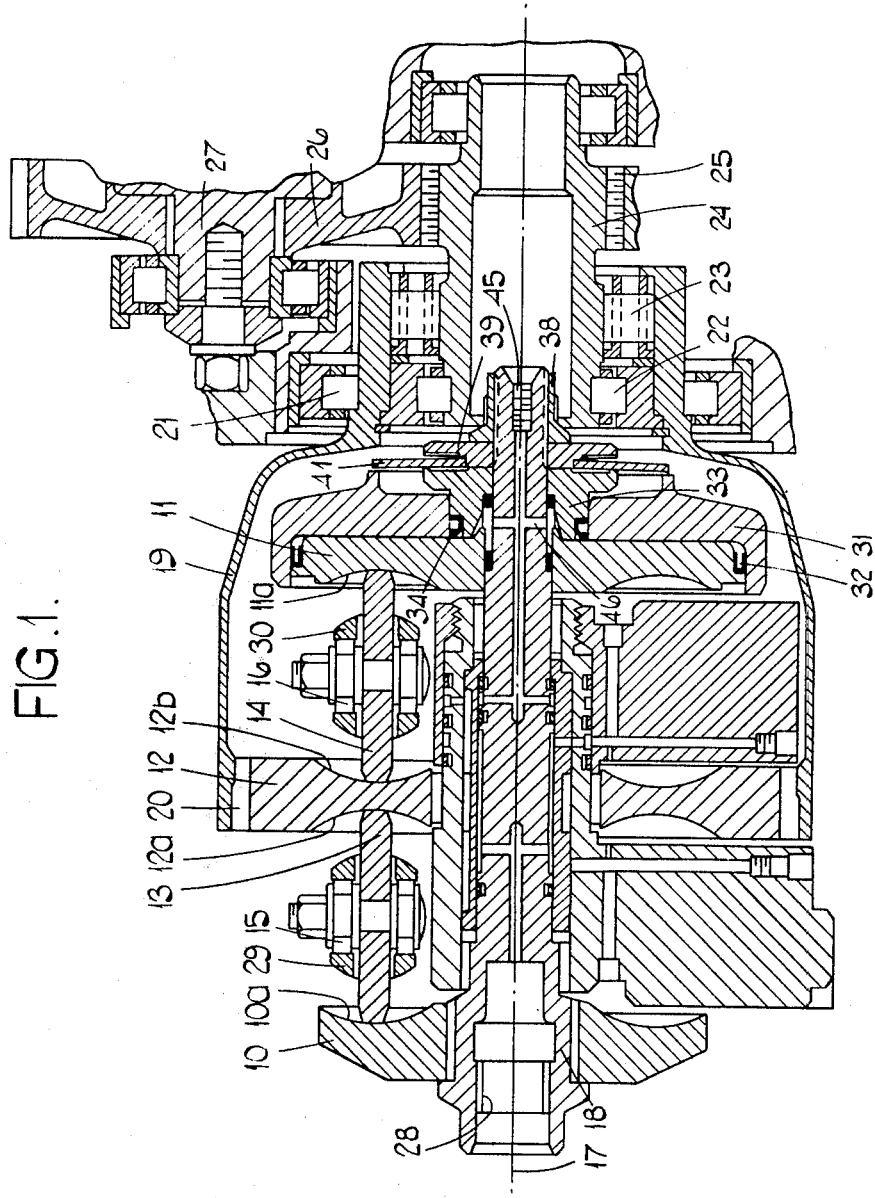
FIG. 1 is a cross-sectional view showing a transmission system constructed in accordance with the invention.

Referring first to FIG. 1, the general layout of the transmission is illustrated. The system includes a variable ratio drive unit having three rotors 10, 11, 12 which have respective part toroidal surfaces 10a, 11a and 12a and 12b respectively. The rotor 12 is situated mid-way between the rotors 10 and 11, and is provided with its part toroidal surfaces 12a and 12b, on opposite axially presented sides thereof. The rotor 10 has its part toroidal surface 10a presented towards the surface 12a and similarly the surface 11a of the rotor 11 is presented towards the surface 12b of the central rotor 12. The rotors 10, 11 are output rotors and the rotor 12 is an input rotor. However, the system will operate perfectly satisfactorily with the rotors 10, 11 as input and the output as the rotor 12. Situated between the rotors 10, 12 and 11 and 12 are respective sets of flat rollers 13, 14. In this example there are three rollers in each set. These are rotatable in a manner which will be described and are for this purpose carried in respective bearings 15, 16. The rollers are shown in FIG. 1 in positions in which they engage the respective surfaces 10a, 12a and 11a, 12b at the same distances from the axis of rotation of the rotors 10, 11, 12. Such axis is identified at 17. The rotors 10, 11 are carried non-rotatably upon a hollow shaft 18. This is supported on suitable fixed structure by means of bearings. Surrounding one end of this drive unit is a hollow casing 19 which is engaged at one end on the external periphery of the rotor 12 by splines 20. The other end of this casing 19 is journalled co-axially with the shaft 18 in bearings 21, 22 and engages through a clutch 23, a hollow shaft 24. This has gear teeth 25 engaging a gear 26 on an input shaft 27. The clutch 23 is provided to allow reversal of the input shaft rotation.

The output of the system is in engagement with the shaft 18 at its end remote from the input shaft 27. The connection to the shaft 18 is represented by splines 28 in the end thereof.

The roller bearings 15, 16 are mounted in respective bearing supports 29, 30 which can be tilted to alter the points of contact between the rollers 13, 14 and the surfaces 10a, 11a, 12a and 12b respectively. By altering the contact by inclining the rollers, the speed of the rotors 10, 11 relative to that of the rotor 12 is altered. The bearing supports 29, 30 are mounted on the relatively fixed structure of the system.

In operation of this transmission system, with variable speed input the system automatically compensates for input speed change, this being achieved through the alteration in the ratio angle of the rollers to provide constant speed at the output.

With inclination in one direction from that shown rotation of the input rotor 12 at a given speed will cause rotation of the output rotor 10, 11 at a slower speed than said given speed. The opposite ratio characteristic can be achieved if the points of contact between the rollers on the input rotor 12 are outside those on the surfaces of the output rotors 10, 11. If, however the rollers engage the surfaces 10a, 11a, 12a, and 12b at the same radial distance on each such surface from the axis 17 of the shaft 18, the input and output rotors 10, 11, 12 will all rotate at the same speed. This represents a drive ratio of 1:1 between the input and the output of the system.

It is however, necessary that the axis of each of the rollers 13, 14 must intersect the gear axis 17 which is the axis of the shaft 18. To change the ratio, the rollers are moved tangentially and they will then steer to new ratio angle positions in which they are again stable. To achieve the ratio change, control cylinders (not shown) for moving the bearing supports 29, 30 are actuated. These are arranged to move the bearing supports 29, 30 in directions which are non-parallel or inclined at acute angles with respect to a plane which is perpendicular to the axis 17, the latter being the axis of rotation of the shaft 18, and of the rotors 10, 11, 12. Actuation of these control cylinders move the axes of the rollers 13, 14 in directions which are substantially tangential with respect to the points of contact of the rollers, with the respective part toroidal surfaces 10a, 11a, 12a and 12b. However, such generally tangential movement of the rollers is accompanied by steering of the rollers such that the rollers may take up positions in which their rotational axes again coincide with the axis 17. To cause such movements, the roller supports are mounted at angles to the said plane perpendicular to the gear axis 17 and this angle is called the caster angle. It is, however, necessary to provide for change in the positions of the roller axes in a direction lengthwise of the gear axis 17, and this is accomplished by movement of the bearing supports. In making such provision for movement of the axes of the rollers 13, 14 in direction lengthwise of the axes 17 the inclination of the bearing supports with respect to the said plane changes. This inclination is the caster angle and consequently the caster angle will change as the ratio of speeds between the input and output rotors changes.

Preferably, the higher the rotational speed induced in the output rotor 12, the greater the caster angle should be, for improved stability in the system at high rotational speeds which may be of the order of 20,000 revolutions per minute.

To ensure that the rollers 13, 14 remain in contact with the torus surfaces 10a, 11a, 12a and 12b of the rotors 10, 11, 12 respectively there is provided an end loading device.

This end loading device is applied to the rotor 11. Surrounding the rotor 11 is a member 31 having an internal cylindrical surface within which the external periphery of the rotor 11 is slidably mounted. A seal 32 is engaged between them. The cylindrical surface of the member 31 is coaxial with the axis 17.

The member 31 also has a coaxial cylindrical surface on its internal periphery and this is slidably engaged on a corresponding cylindrical surface on a part 33. A further seal 34 is positioned between the corresponding surfaces of the member 31 and part 33.

Figure 2:
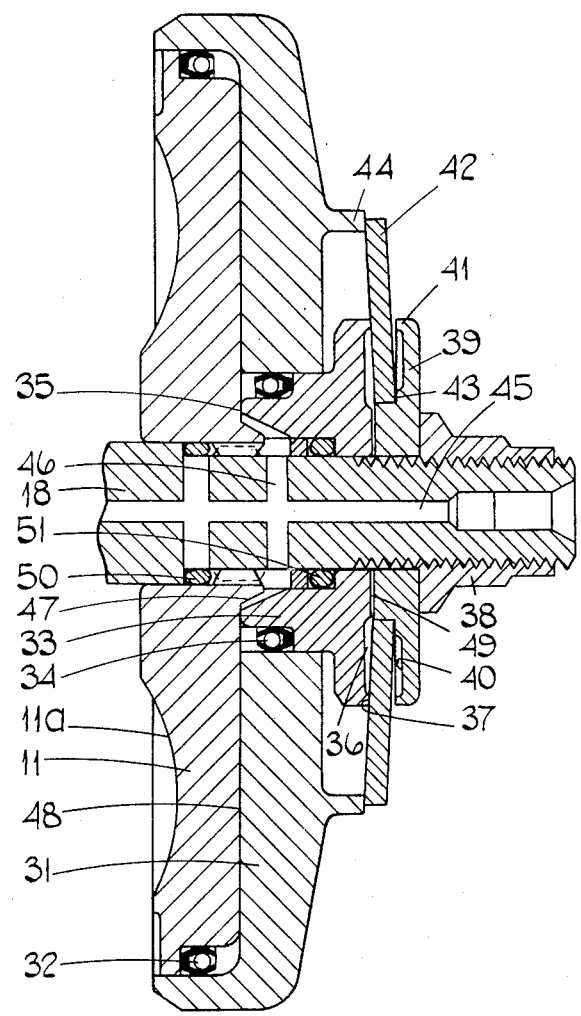
FIG. 2 is an enlarged view of part of the end loading device of the construction shown in FIG. 1.

The part 33 at a narrower end provides an abutment at 35 for a surface of the rotor 11 at the side thereof remote from the torus surface 11a. At its other end the part 33 has a flange which is recessed at 36 in its end face to provide a peripheral rim 37. On the end of the shaft 18 at which the end loading device is provided there is secured a nut 38. Against this acts a stepped washer 39 which is recessed at 40 to define a peripheral rim 41. The peripheral rims 37 and 41 of the part 33 and of the washer 39 are of the same diameters and are presented towards one another. Positioned between them however is a spring washer 42. This is of the kind known as a Belville washer or Schnorr disc. It is therefore bowed and its inner periphery rests on a shoulder 43 formed on the stepped washer 39. These features are apparent from FIGS. 2, 3, and 4.

On the face of the member 31 presented towards the external peripheral edge of the spring washer 42 the member has an integral circular ring 44 against which such external periphery of the spring washer can abut as will be described.

The shaft 18 is provided with a coaxial drilling 45 from the end at which the nut 38 is fitted and communicating with this are cross-drillings 46 which communicate with a space defined within the part 33 and between that part and the rotor 11. Such space is identified by numeral 47 in FIG. 2.

High pressure fluid supplied to this space can reach the zone defined between the member 31 and the rotor 11. Such zone is identified by numeral 48. High pressure fluid supplied through the drilling 45, cross drillings 46 space 47, and into the zone 48 provides pressure for end loading the rotors 10, 11, 12 and rollers 13, 14.

Figure 3:
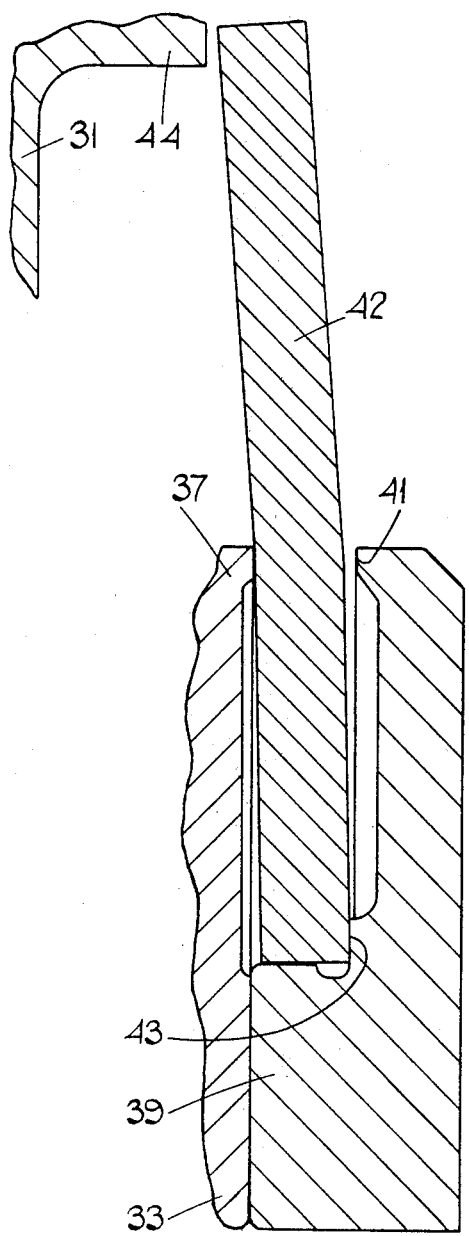
FIG. 3 is a still further enlarged view of parts of the end loading device in one position.

FIG. 3 shows the condition of the spring washer 42 in relation to the part 33 and the stepped washer 39. Under such conditions the oil which is supplied to the zone 48 is at relatively low pressure and consequently the member 31 will occupy a position in which this zone 48 is at a minimum. The external periphery of the spring washer 42 will be out of contact with the integral ring 44 on the member 31 but it will be in contact with the rim 37 on the part 33. The relatively high spring force available here will keep the part 33 in contact with the rotor 11 through the abutment 35 on its end. This spring action will thus tend to open the gap indicated in FIG. 2 at 49 between the part 33 and the stepped washer 39.

Figure 4:
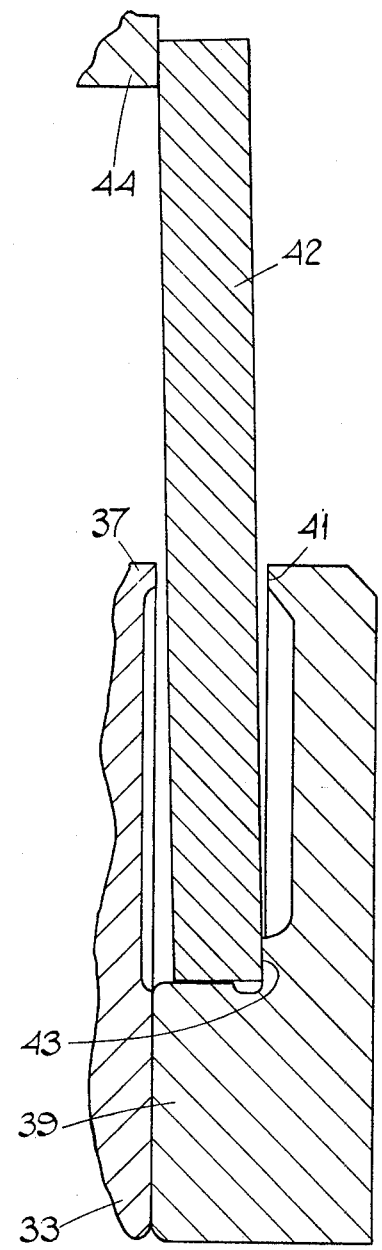
FIG. 4 is a view similar to FIG. 3 with the parts in another position.

However, as pressure increases in the zone 48 by application of high pressure fluid through the drilling 45 and cross-drilling 46 and space 47, the spring washer 42 will tend to move towards the position shown in FIG. 4. Under these conditions, the member 31 has moved away from the rotor 11 until its integral ring 44 contacts the external edge of the spring washer 42, to apply a lighter spring force thereon. This action will in turn separate the spring washer 42 from the rim 37 of the part 33.

To seal the space 47 and to prevent leakage of hydraulic fluid either within the rotor 11 or within the part 33 there are provided further seals 50, 51 between these components and the shaft 18 respectively.

The effect of changing the contact point of the spring washer 42 from the rim 37 to the ring 44 spaced radially outwardly of the rim 37 is that a lower spring force is applied to the end loading device as operational fluid pressure levels are reached. Such operational fluid pressure is reached when the operational speed of the system is relatively high. Under such high speed conditions there is a centrifugal gradient built up within the space 48 in which the fluid pressure is higher towards the outside of this zone. The application of lower spring force by means of the washer 42 tends to counteract the centrifugal force.

What is claimed:

1. An axial loading device for applying an axial load to an axially movable member including spring means acting between an abutment and the member, said member being axially movable relatively to said abutment, the spring means acting on one part of said member in a first axial position of said member and acting on a further part of said member when it is in a further axial position, the said one part of the member being spaced from the said further part of said member, such that different axial loading is applied to said member by said spring means when the member occupies said first and said further axial positions respectively wherein said axially movable member includes inner and outer coaxial elements, one of said elements including said one part upon which said spring means acts when said member is in a first axial position, the other of said elements including said further part of said member upon which said spring means acts when said member is in a further axial condition, said two coaxial elements being relatively axially movable with respect to each other.

2. An axial loading device as claimed in claim 1 in which the spring means is a spring disc and said parts of the member are respective annular surfaces on which respective portions of the disc bear, such portions of the disc being at respective different radial distances from the disc centre.

3. An axial loading device as claimed in claim 2 in which the spring disc is supported at its centre zone and locates against a fulcrum which forms said abutment against which the spring disc force is reacted.

4. An axial loading device as claimed in claim 1 incorporated in a transmission system wherein the axial load is applied to a rotor assembly of the system.

* * * * *